A. T. HAY.
PREVENTING INCRUSTATION OF SUGAR OR OTHER BOILERS.

No. 59,910. Patented Nov. 20, 1866.

United States Patent Office.

IMPROVEMENT IN PREVENTING INCRUSTATION OF SUGAR OR OTHER BOILERS.

A. T. HAY, OF BURLINGTON, IOWA.

Letters Patent No. 59,910, dated November 20, 1866.

SPECIFICATION.

TO ALL WHOM IT MAY CONCERN:

Be it known that I, A. T. HAY, of Burlington, in the State of Iowa, have invented a new and useful Improvement in the Mode of Preventing Incrustation on the Bottoms of Evaporating Pans and Kettles; and I do hereby declare the following to be a full and exact description of my said invention, which will be more fully understood by referring to the accompanying drawings, in which—

Figure 1:
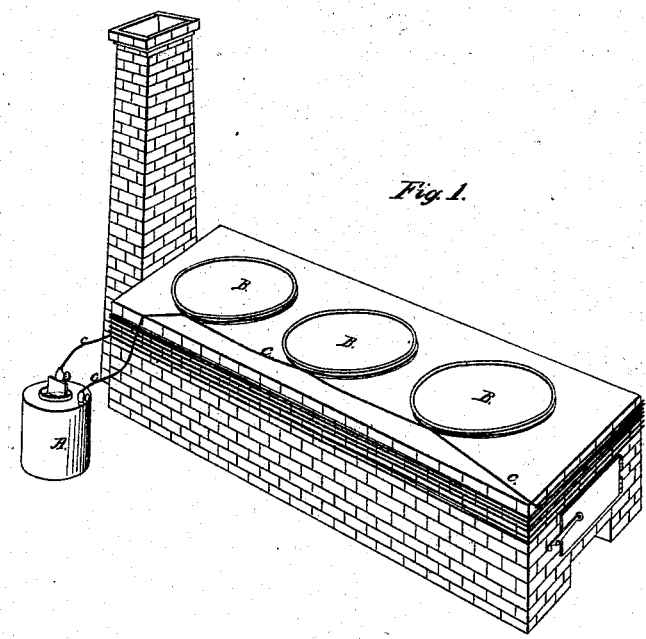
Figure 2:
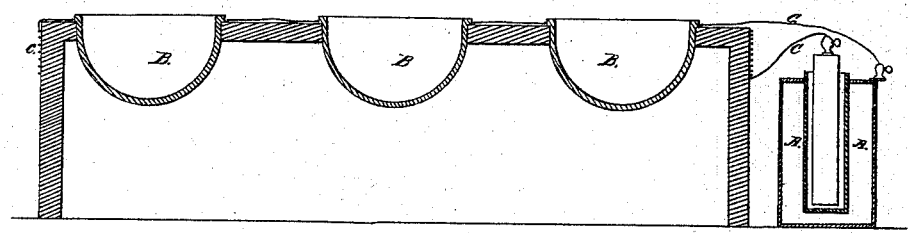

Figure 1 is a perspective view of the apparatus used by me.
Figure 2 is a longitudinal section of the same.

The nature of my invention consists in providing a cheap and convenient means for preventing the inconvenience that is experienced in the evaporation of water in the manufacture of salt, sugar, and other like substances, and other analogous operations, in consequence of the bottom of the evaporating pans or kettles being incrusted with some solid substance, which is generally of a sedimentary character, and which greatly interferes with the evaporation, besides producing other pernicious consequences. I have discovered that a galvanic current, so directed and arranged as to develope an electro-magnetic effect in the pans or kettles, is an effectual remedy to this mischief. To enable others to apply this remedy, I proceed to describe my plan of arrangement and operation, which may be greatly varied without departing from the principle of my said invention.

A represents a battery, B the kettles, r c c c the wire leading from one pole of the battery to the other, and being coiled around each of the kettles in its progress from one pole to the other. The wire may be insulated throughout, or that portion which is coiled around the kettles may be embedded in a mortar of gypsum, or other non-conducting substance, so as to preserve the different coils from coming in contact with each other. There should be several coils around each of the kettles, in order to produce the greatest and best effect. Instead of having a coil around each of the kettles separately, the wire may pass around the furnace, which embraces all the kettles, as is shown in fig. 1, but this does not produce so satisfactory a result as to keep the coil around each of the kettles separately. In the evaporation of the sorghum juice, the pans used are generally of an oblong form, and very shallow. The passage of the wire around the entire evaporating pan will produce the desired effect as well as in a kettle.

I do not describe the construction or form of the battery represented, because I make no claim on such battery. Any galvanic battery will answer the purpose. They differ only in convenience and cheapness. My invention contemplates the use of galvanic electricity, applied in this way, however developed. When arranged as above described, I find, by experiment, that as long as the circuit is closed and the galvanic current is kept in circulation, no incrustation is formed on the bottom of the kettle, which will thus be kept clear from any incrustation, and the substance undergoing evaporation within it will not become liable to be burnt or injured, as is so frequently the case in other circumstances. It may be supposed that if the sediment is thus prevented from forming an incrustation, it will be thrown back into the mass of the sirup or brine, and thus render it impure, but my experience satisfies me that such is not the case. What would otherwise form an incrustation, seems to rise to the surface, so that it can be skimmed off, and thus the salt, sugar, or other substance will be left more pure than it would otherwise be. I find also that this invention can be advantageously applied to the preparation of preserves, and other analogous purposes, with great success and advantage. I am also of the opinion that the formation of scale on steam boilers may be prevented upon this same principle; and also that by surrounding a cooking-stove with coils of wire, as herein contemplated, various culinary operations may be effectually improved upon a like principle.

Having thus described my invention, what I claim as new, and desire to secure by Letters Patent, is—

The application of electricity to prevent the formation of scale or incrustation in evaporating pans or kettles, substantially in the manner herein described.

A. T. HAY.

Witnesses:
R. T. CAMPBELL,
EDW. SCHAFER.